(12) United States Patent
Suard et al.

(10) Patent No.: US 12,105,038 B2
(45) Date of Patent: Oct. 1, 2024

(54) THERMAL MEASUREMENT SYSTEM

(71) Applicant: Schlumberger Technology Corporation, Sugar Land, TX (US)

(72) Inventors: Romain Suard, Clamart (FR); Vladimir Shitikov, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 465 days.

(21) Appl. No.: 17/359,886

(22) Filed: Jun. 28, 2021

(65) Prior Publication Data
US 2022/0412904 A1 Dec. 29, 2022

(51) Int. Cl.
| | |
|---|---|
| *G01N 25/20* | (2006.01) |
| *E21B 47/07* | (2012.01) |
| *G01K 1/02* | (2021.01) |
| *G01V 9/00* | (2006.01) |
| G01K 7/18 | (2006.01) |
| G01K 17/00 | (2006.01) |
| G01K 17/08 | (2006.01) |

(52) U.S. Cl.
CPC ............ *G01N 25/20* (2013.01); *E21B 47/07* (2020.05); *G01K 1/026* (2013.01); *G01V 9/005* (2013.01); *G01K 7/18* (2013.01); *G01K 17/00* (2013.01); *G01K 17/08* (2013.01); *G01K 2213/00* (2013.01)

(58) Field of Classification Search
CPC ........ G01N 25/20; E21B 47/07; G01K 1/026; G01K 7/18; G01K 2213/00; G01K 17/00; G01K 17/08; G01V 9/005
See application file for complete search history.

(56) References Cited

U.S. PATENT DOCUMENTS

| | | | | |
|---|---|---|---|---|
| 4,195,349 A | * | 3/1980 | Balkanli | E21B 47/26 377/25 |
| 5,244,146 A | * | 9/1993 | Jefferson | F24D 19/10 236/46 F |
| 10,947,837 B2 | * | 3/2021 | Jarvis | E21B 47/13 |

(Continued)

FOREIGN PATENT DOCUMENTS

| | | |
|---|---|---|
| GB | 2550869 A | 12/2017 |
| WO | 2017203293 A1 | 11/2017 |

(Continued)

OTHER PUBLICATIONS

Well Watcher Flux, Multizonal reservoir monitoring system, https://www.slb.com/~/media/Files/completions/brochures/wellwatcher_flux_br.pdf, downloaded on Jun. 23, 2021 (2 pages).

*Primary Examiner* — Nathaniel T Woodward
*Assistant Examiner* — Philip L Cotey
(74) *Attorney, Agent, or Firm* — Trevor G. Grove

(57) ABSTRACT

Embodiments described herein provide a thermal flux apparatus, forming a distributed temperature measurement system and comprising a plurality of temperature probe modules, each temperature probe module comprising a sensing element having an electrical resistance that varies with temperature; a data acquisition module comprising an analog-to-digital converter with an input electrically connectable to the plurality of temperature probe modules; and an electrical network comprising between 6 and 8 wires connecting each temperature probe module with the data acquisition module.

19 Claims, 8 Drawing Sheets

(56) References Cited

U.S. PATENT DOCUMENTS

| | | | |
|---|---|---|---|
| 11,111,777 B2* | 9/2021 | Jarvis | G01K 1/026 |
| 2004/0244970 A1* | 12/2004 | Smith, Jr. | E21B 43/11 |
| | | | 175/50 |
| 2005/0149264 A1* | 7/2005 | Tarvin | G01K 11/32 |
| | | | 374/E11.015 |
| 2013/0272898 A1* | 10/2013 | Toh | E21B 47/008 |
| | | | 417/44.1 |
| 2014/0352955 A1* | 12/2014 | Tubel | E21B 47/12 |
| | | | 166/250.15 |
| 2015/0233773 A1* | 8/2015 | Sale | G01K 1/026 |
| | | | 374/29 |
| 2016/0168977 A1* | 6/2016 | Donderici | E21B 47/022 |
| | | | 175/45 |
| 2017/0009568 A1* | 1/2017 | Guelat | E21B 47/103 |
| 2018/0094990 A1* | 4/2018 | Rud | G01K 13/02 |
| 2020/0232319 A1* | 7/2020 | Tubel | E21B 47/00 |
| 2021/0381364 A1* | 12/2021 | Jarvis | E21B 47/017 |

FOREIGN PATENT DOCUMENTS

| | | |
|---|---|---|
| WO | 2017203294 A1 | 11/2017 |
| WO | 2017203296 A1 | 11/2017 |
| WO | 2021046631 A1 | 3/2021 |

* cited by examiner

THERMAL MEASUREMENT SYSTEM

FIELD

Embodiments described herein generally relate to thermal measurement. Specifically, the invention relates to distributed and commuted thermal measurement arrays deployed along a length of an earth borehole. The invention relates also to methods of achieving accurate, repeatable and high resolution temperature measurements with such arrays.

BACKGROUND

Measurement of temperature in a distributed spatial array is helpful to determine thermal fluxes and gradients in many situations. One such situation is in a producing hydrocarbon well. Measurement of thermal fluxes and gradients in a hydrocarbon borehole, whether producing or not, can be helpful in predicting response of materials to the thermal environment, in characterizing a reservoir or in optimizing well production.

Currently, Schlumberger already introduced two distributed temperature sensor (DTS) to the market: a fiber optic based distributed temperature sensor (DTS), one of which is WellWatcher Neon™ for example, and a digital distributed temperature sensor (DTS), called WellWatcher Flux™ and based on miniaturized digital temperature sensors.

Thermal backscattering in fiber optic based distributed temperature sensor (DTS) can be used to determine temperature in a hydrocarbon borehole, sometimes requiring miles of fiber optic cable to measure temperature in a small interval of the borehole. In addition, the cost and the complexity associated with the deployment of a fiber optic based solution is not compatible with all types of operations during oil and gas operations. For example, during a well test, also called Drill Stem Test (DST), operations last a couple of weeks and equipment are pull out of hole at the end of the DST. Plus, sections of the well are sealed using packers which make deploying a fiber optic based cable a very complex operation as the cable needs to pass through the seal. Better ways of measuring thermal gradients in a hydrocarbon borehole are needed, and such improvements can be helpful in other situations.

WellWatcher Flux™ system includes distributed temperature arrays made of miniaturized, hermetically sealed digital temperature sensors using platinum resistance temperature detectors (RTD) as sensing elements. Temperature sensors are interconnected together with a electric cable and each array can hold up to 60 sensors, each spaced at least 5 feet (1.5 m) apart, with a maximum length of 1,640 feet (500 m) for a full array. All sensors are communicating with each other on a serial communication. Each temperature sensor is enclosed in a metallic tube with a larger outer diameter (OD) than the OD of the electric cable. Such a protuberance is not compatible with all well test designs as the clearances at the bottom of the well are very small between the casing and the tubing. Finally, the electronics of the sensors is relatively complex which prevent the necessary miniaturization for system survivability during the most demanding downhole conditions, like the near-field ballistic shock if the system is deployed on perforating guns.

An alternative to these prior art DTS systems has been introduced to the market by Metrol, called PRO-LOG™. It is a DTS system constructed around a multiple of discrete temperature sensors enclosed within a control line (e.g. with an OD of ⅜ inch) and attached to a memory processor to collect and transmit data. A patent has been published by Metrol covering PRO-LOG™ in 2019, see application GB2550869B. The system of GB2550869 includes a data acquisition unit able to compute a resistance value for several temperature probes but connecting each temperature probe to the data acquisition unit via a separate connection, necessitating to use a complex electrical network when the number of temperature probes is high and/or to use a plurality of acquisition units when increasing the number of sensors.

SUMMARY

Embodiments described herein provide a thermal flux apparatus, forming a distributed temperature measurement system and comprising a plurality of temperature probe modules, each temperature probe module comprising a sensing element having an electrical resistance that varies with temperature; a data acquisition module comprising an analog-to-digital converter with an input electrically connectable to the plurality of temperature probe modules; and an electrical network comprising between 6 and 8 wires connecting each temperature probe module with the data acquisition module.

Other embodiments described herein provide a thermal flux apparatus, forming a distributed temperature measurement system and comprising a plurality of temperature probe modules, each temperature probe module comprising a sensing element having an electrical resistance that varies with temperature, at least two electrical switches, and a logic circuit configured to control the electrical switches; a data acquisition module comprising an analog-to-digital converter with an input connected to the plurality of temperature probe modules, and a digital circuit electrically connected to the logic circuits; and an electrical network connecting each temperature probe module with the data acquisition module, wherein the at least two electrical switches of each temperature probe module are coupled to the sensing element of the respective temperature probe module to connect the sensing element to the input of the analog-to-digital converter, wherein the logic circuits of the temperature probe modules are configured to operate as a shift register and the digital circuit of the data acquisition module is configured to control the shift register, wherein the data acquisition module is configured to drive the logic circuits using a common clock signal comprising beats and to transmit a control message to a first logic circuit of a temperature probe module of the plurality, wherein the control message includes instructions for connecting the temperature probe module to the analog-to-digital converter using the electrical switches.

Other embodiments described herein provide a method for operating a thermal flux apparatus, wherein the apparatus forms a distributed temperature measurement system and comprises a plurality of temperature probe modules, each temperature probe module comprising a sensing element having an electrical resistance that varies with temperature, at least two electrical switches, and a logic circuit configured to control the electrical switches; a data acquisition module comprising an analog-to-digital converter having an input connected to the plurality of temperature probe modules, and a digital circuit electrically connected to and configured to control the logic circuit of at least one temperature probe module; and an electrical network connecting each temperature probe with the data acquisition module, wherein the at least two electrical switches of each temperature probe module are operable to connect the sensing element to the input of the analog-to-digital converter, wherein the method comprises transmitting via the digital circuit a clock signal comprising a plurality of beats to the logic circuits; at a first predetermined beat of the clock signal, transmitting via the digital circuit a control message to a first logic circuit of a first temperature probe module of the plurality; upon reception of the control message by the first logic circuit, controlling the electrical switches of the first temperature probe module via the first logic circuit to connect the sensing element of the first temperature probe module to the analog-to-digital converter; at a second predetermined beat of the clock signal, transmitting the control message from the first logic circuit to a second logic circuit of a second temperature probe module of the plurality; upon transmission of the control message by the first logic circuit, controlling the electrical switches of the first temperature probe module via the first logic circuit to disconnect the sensing element of the first temperature probe module from the analog-to-digital converter; upon reception of the control message by the second logic circuit, controlling the electrical switches of the second temperature probe module via the second logic circuit to connect the sensing element of the second temperature probe module to the analog-to-digital converter.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
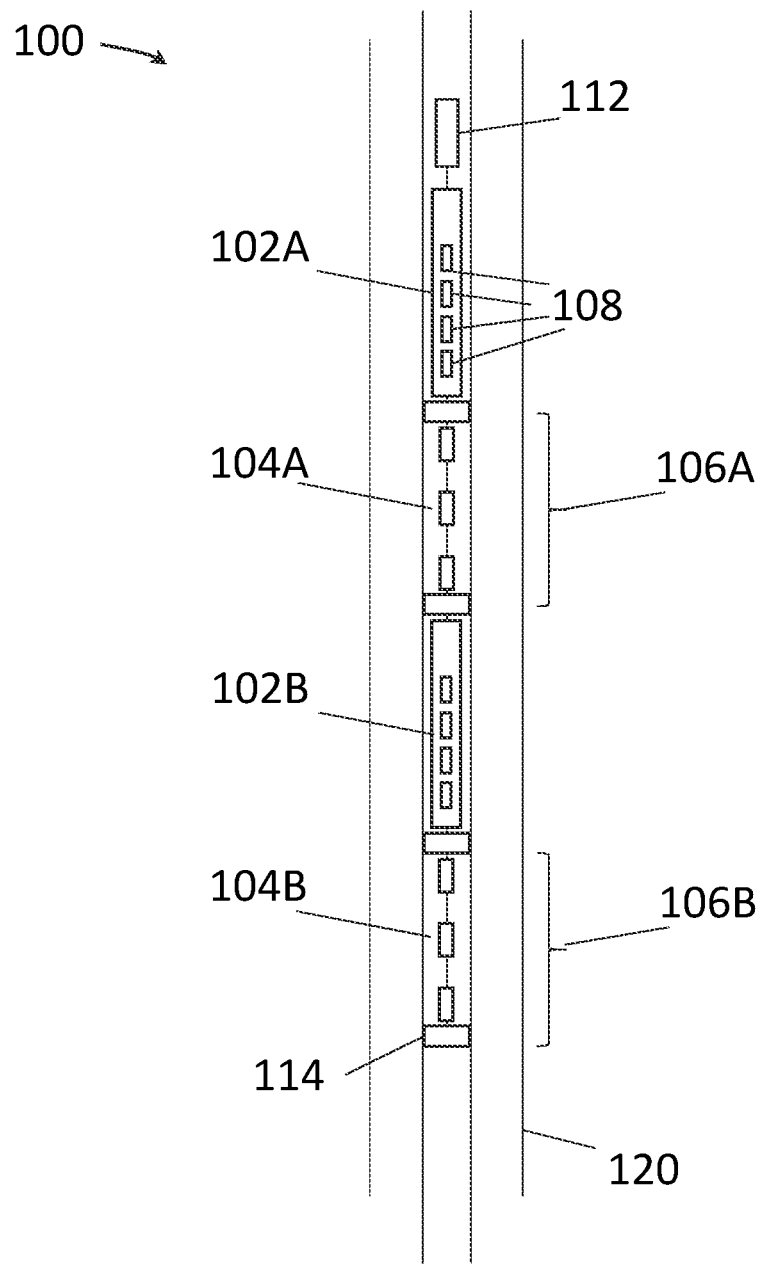
FIG. 1 is a schematic view of a drill string that includes thermal flux apparatus as described herein, according to one embodiment.

A thermal flux measurement apparatus described herein measures and records discrete distributed temperature along a length of an earth borehole such as a production zone of a gas or oil well when deployed. A data acquisition module continuously monitors and digitally records fluid temperature across the production zone. An array of temperature probe modules is deployed with a protective sheathing, typically a metal tubing or control line, which is deployed with a drill string, which may include perforating guns. The array of temperature probe modules may be deployed before or after the well is perforated. The temperature sensing element of a temperature probe module is a resistive device with electrical resistance that varies with temperature. After calibration and optional additional processing such as dynamic error correction, the system makes and records accurate, repeatable, high resolution temperature data of the production zone. FIG. 1 is a schematic view of a drill string 100 that includes a thermal flux measurement apparatus as described herein, according to one embodiment.

The drill string 100 is shown deployed in a well 120 for context. The drill string 100 includes one or more thermal flux detection units 102. Here, two thermal flux detection units, a first thermal flux detection unit 102A and a second thermal flux detection unit 102B, are shown. Each such unit comprises one or more temperature probe modules 108. A data acquisition module 112 is connected to the thermal flux detection units 102A and 102B, in this case by wire. The data acquisition module 112 interprets signals received from the thermal flux detection units 102A and 102B to determine temperature and thermal flux.

Figure 2:
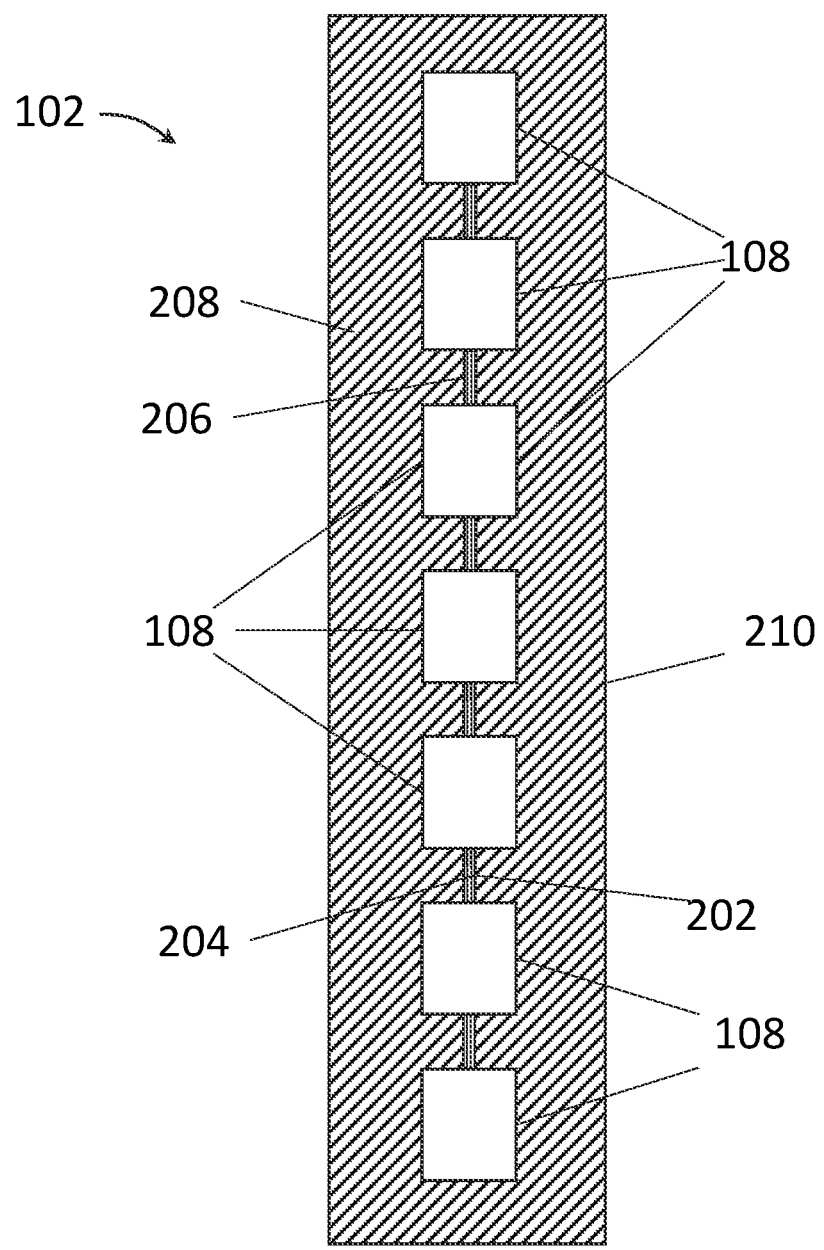
FIG. 2 is a schematic view of a portion of a thermal flux apparatus according to one embodiment.

FIG. 2 is a schematic view of a thermal flux detection unit 102. The temperature probe modules 108 are positioned at selected locations of the drill string 100 (FIG. 1). One thermal flux detection unit 102 is shown in FIG. 2 with seven temperature probe modules 108. A thermal flux detection unit herein may have any number of temperature probe modules 108. The temperature probe modules 108 are interconnected together using an electrical network 202 of between 6 and 8 wires 204, which may be disposed through a passage 206 formed through a filling material 208. The number of wires 204 is independent from the number of temperature probe modules 108, and a large number of temperature probe modules 108 can be connected using 8 wires 204. For example, sixteen or more temperature probe modules 108 can be connected using 8 wires 204. The filling material 208, temperature probes 108 and electrical network 202 are all enclosed in a protective sheath 210, which may be a metal tubing or control line. The protective sheath 210 may be a control line deployed along the drill string 100 to provide a conduit for electrical connectivity among the various tools, sensors, and other units that make up the drill string 100. The filling material 208 may be a fluid material or a solid material, for example oil, polymer, or potting compound, that performs a protective function or a thermal flux function. Where the filling material 208 is a solid material, the passage 206 may be a bore through the filling material 208, or a separate conduit disposed through the filling material 208, such as a plastic or metal tube. Where the filling material 208 is a fluid material, the passage 206 is provided as a separate conduit, such as a plastic or metal tube.

Each temperature probe module 108 uses a discrete resistive temperature sensing element, for example platinum resistors, which may be referred to as resistance temperature detectors (RTD). In general, in temperature sensing tools, a ratio of a temperature-variable resistance to a temperature-stable resistance is resolved. Temperature is determined from a known relationship of temperature to electrical resistance for a resistive element that changes with temperature in comparison to electrical resistance for a resistive element that is temperature stable. In one method, temperature is determined ratiometrically by measuring and comparing electrical resistance of a resistive element (RTD) that changes with temperature to electrical resistance of a known, temperature stable resistive element (reference resistor).

The thermal flux measurement apparatus described herein is an autonomous, battery powered, digital processor (microcontroller) controlled apparatus, with a central data acquisition module 112 and one or more units of addressable temperature probe modules 108 electrically connected to the data acquisition module 112 (FIG. 1). A microcontroller is configured to address individual temperature sensors to obtain temperature readings at specific locations in the units. The microcontroller may be housed with the data acquisition module 112, or may be located apart from the data acquisition module 112 and electrically connected thereto.

Figure 3:
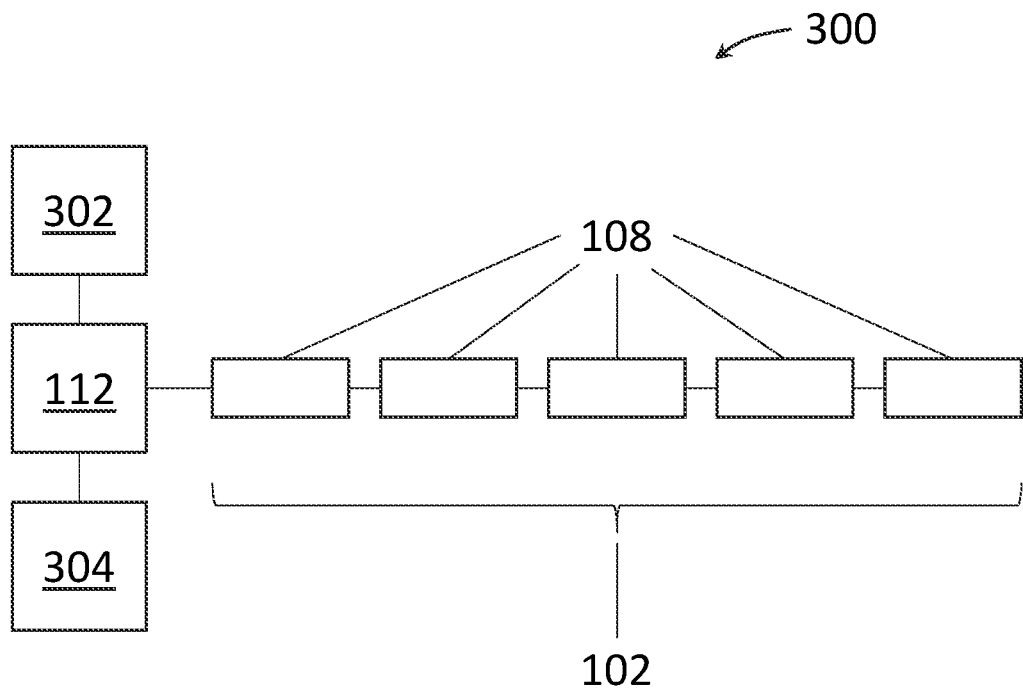
FIG. 3 is a block diagram of a thermal flux apparatus according to one embodiment.

FIG. 3 is a block diagram of a thermal flux apparatus 300 according to one embodiment. One or more communication modules 302 may be provided to send and receive temperature data between the data acquisition module 112 and surface installations. A local power supply 304, such as a battery unit, may be connected with the data acquisition module 112. Power can also be supplied by wired connection from the surface. When so deployed, a unit 102 including multiple temperature probe modules 108 can resolve distributed fluid temperature along the face of an earth borehole. The drill string can be positioned such that the unit 102 can resolve distributed fluid temperature along the production zone of a gas or oil well. The distributed temperature measurements enable contemporaneous thermal sensing and trending along a formation of interest to reveal the evolution of thermal conditions in the formation.

Temperature probe modules 108 generally comprise a resistive temperature sensing element connected to a circuit comprising logic devices and electrical switches. The apparatus makes ratiometric measurements, for example using an analog-to-digital converter (ADC) to compute and digitize the ratio of resistances between a temperature-variable resistor (a "probe" device) and a temperature-stable resistor (a "reference" device) to determine the resistance value of the RTD that is related to temperature. The ADC is located in the data acquisition module 112 in order to limit the complexity of the system.

The data acquisition module 112 is usually electrically connected to at least one temperature probe module, but multiple temperature probe modules are typically connected to the data acquisition module 112. For example, the apparatus may include 100 temperature probe modules electrically connected, as an array, to the data acquisition module 112.

The resistive temperature sensing element of each temperature probe module can be disconnected or connected to the data acquisition module using one or more electrical switches, such as solid state switches. In such a configuration, each temperature probe in an array can be serially addressable. Each temperature probe has at least a logic circuit controlling the switches to activate the temperature measurement (i.e. connect temperature sensing element of the probe 108 to the data acquisition module 112, in particular ADC). When multiple probes are connected electrically, the logic circuits connect in series to form or build a long chain of serially addressable temperature probes.

Temperature probe(s) can be deployed by means of a pressure rated or pressure balanced metal tube or control line. As noted above, a protective sheath 206 (FIG. 2) is generally used, which can be a metal tubular housing or control line. Pressure balancing can be accomplished by applying pressure within the protective sheath 206 to compensate well bore pressure outside the protective sheath 206. It is typically useful for control line material to be compatible with the environment. Metal alloys such as stainless steel, Inconel, Nitronic or other corrosion resistant materials may be used. A heater may be included in the apparatus to enable thermal perturbation of the system for direct thermal flux analysis of fluids in the environment.

The autonomous data acquisition module typically includes a microcontroller (including one or more processor), serial communication port, digital memory, power supply, battery, analog-to-digital converter and control logic (ie digital circuit) for controlling the logic circuits of the one or more temperature probe modules. The apparatus may include, or be connected to, a wireless modem for communication between subterranean earth borehole tools and/or the surface. The data acquisition module controls the acquisition of temperature data from the probe modules 108, processes the data, and stores the data in local digital memory. If computations are too intensive, raw or unprocessed data may be digitally stored and processed later when time permits. Because modem data bandwidth may be limited, temperature data may be compressed with a compression algorithm to provide a snapshot or summary of the temperature data collected. Modem telemetry may also be used to send commands from the surface to the central data acquisition module.

The data acquisition module 112 can be configured to address each temperature probe individually via its respective logic circuit, integrated with the temperature probes that control the electrical switches of the temperature probe. The temperature probes can be grouped, for example on a printed wiring board containing four temperature probes each, but any number of temperature probes could be grouped on one printed wiring board. Arrays can be as long as 25, 50, 75, 100 or more modules. Temperature probes or printed wire boards can be spaced 1 m, 2 m or even 4 m apart from each other. Arrays can be as long as 50 m, 100 m, or even 400 m.

Figure 4:
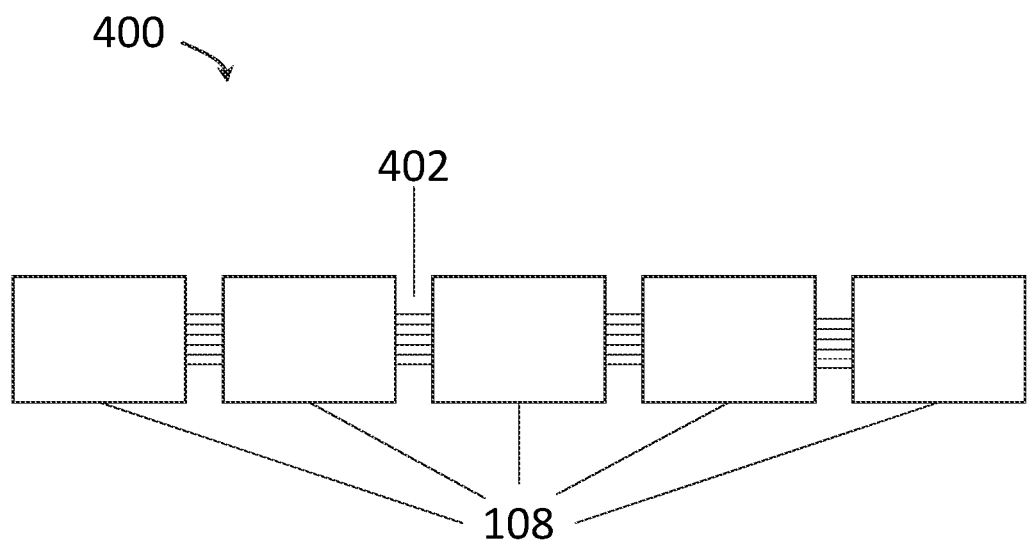
FIG. 4 is a schematic diagram of a temperature probe grouping, according to one embodiment.

FIG. 4 is a schematic diagram of a temperature probe array 400, according to one embodiment. In this array, the temperature probes 108 are connected using a six-wire electrical network 402. Each temperature probe 108 is connected to every other temperature probe 108 using the six-wire electrical network 402. As described elsewhere, the six-wire electrical network 402 may include a measurement network to provide temperature measurement, the measurement circuit connecting the sensing element of each probe module 108 to the ADC of the data acquisition module and a logic network connecting the logic circuit of each probe module 108 to the digital circuit of the data acquisition module to allow the temperature probes 108 to be addressed individually using appropriate logic.

Resistive devices are used herein to measure temperature. A probe resistive device is compared to a basis resistive device (which can also be a reference resistor) and a relationship is determined. In one case a ratio of resistances is determined, hence, a ratiometric measurement. In this application, both the probe and basis resistive devices are exposed to the same local environment at which the temperature is to be measured. In general, properties of all materials change with temperature, but the properties of some materials change less than those of other materials. The probe resistive device is made of a material having electrical resistance that changes with temperature while the basis resistive device is made of a material that is more temperature stable over the operating temperature range. A ratio of the resistances can be used as a reliable indicator of temperature. Once the ratio is known, electrical resistance of the probe resistive device can be calculated, and that resistance can then be related to the absolute temperature experienced by the device in the local environment. The accuracy and repeatability of the measurement is determined by these two resistive elements as long as the supplemental instrumentation for determining the resistance ratio is properly configured and is nominally functional over the operating temperature range.

One useful resistive material for sensing thermal condition is platinum, since platinum is resistant to chemical attack and provides high accuracy and repeatability for electrical resistance measurement. Platinum also has relatively high bulk resistivity, which improves measurement of electrical resistance. Other metals such as nickel, copper, and alloys of these metals, can also be used.

The electrical behavior of the platinum resistive temperature device ("Pt RTD") with respect to temperature change is well understood in the industry, with relatively linear temperature coefficient of resistance over a large temperature range. For example, a simple second order correction can provide accuracy of ±0.6° C. error from 0° C. to 200° C. for a Pt RTD using known correction coefficients. In one embodiment, a Pt RTD is a wire wound or thin-film element with typical electrical resistance of 100, 500 or 1000 ohms at 0° C. and with a temperature coefficient of resistance of 3.85E-3 ohms/ohms/° C. under European standard IEC-751.

The ratiometric measurement referred to above uses a reference resistor. An ideal resistor does not change electrical resistance when the temperature of the resistor changes. There are no ideal resistors, but ultra-high precision resistors having relatively stable electrical resistance with temperature change are offered by passive components.

An analog to digital converter (ADC) is used to make the temperature measurement. The ADC converts an analog signal into a numeric representation or digital signal that is based on, or representative of, a ratio between the analog input signal and a reference signal. Any ADC can be used that can convert the analog signal, in a timely manner and with enough sample rate to satisfy conditions of the Nyquist-Shannon sampling theorem, into a digital signal that a digital computer can use. ADCs are typically referred to as 8-bit, 10 bit, 12, bit, 14-bit, 16-bit, 24 bit, or 32-bit devices, the number of bits defining how closely the device can differentiate ratios of reference and input signals. The reference signal is typically selected to be relatively stable.

The reference resistor and the Pt RTD are connected in series and the same current is run through both devices at the same time. An ADC can be used to sample the voltage developed across each resistor by connecting the inputs of the ADC to terminals of each resistor.

To make a ratiometric measurement of resistances, the ADC samples the absolute voltage developed across each resistor (the Pt RTD and the reference resistor) and a ratio of the voltages is output. By Ohm's Law the ratio of voltages is the same as the ratio of resistances, since the current through both devices is the same. Thus, the reference resistance can be estimated by multiplying the ADC output with the known resistance of the reference device.

Accuracy and repeatability of the temperature measurement in such devices is determined only by the accuracy and repeatability of the Pt RTD resistance, wire resistance, and reference resistance. The current source does not affect the overall accuracy if the current source stays within the voltage compliance range. Any minor errors that do occur can be calibrated out.

A temperature probe can be located up to 50 m, 100 m or 400 m from the data acquisition module. Thus the leads used to connect the ADC to the Pt RTD terminals can be very long. Lead wire resistance changes with temperature and can become part of the voltage drop of the RTD depending on the number of wires used to connect the ADC to the resistor terminals. If not compensated, lead wire resistance can affect accuracy and repeatability of temperature measurement using resistive devices.

Figure 5:
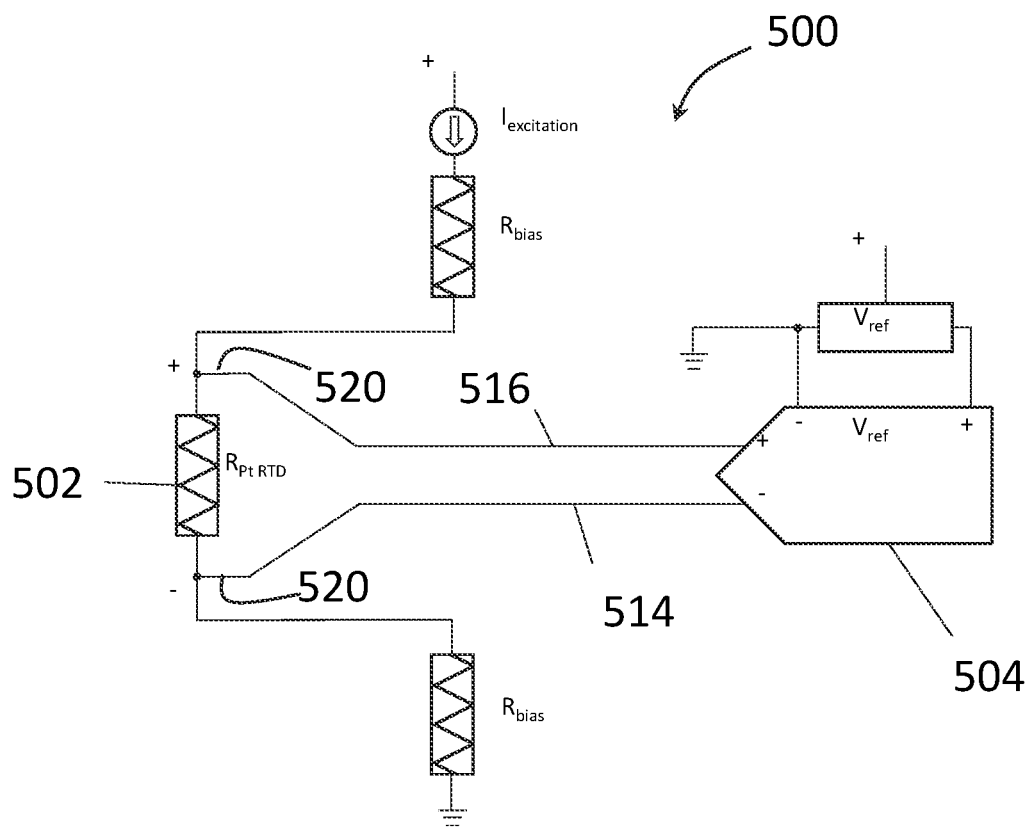
FIG. 5 is a circuit diagram of a temperature sensing circuit, according to one embodiment.

One way to compensate for the lead resistance errors is to use a 3-wire or 4-wire connection for the measurement network. The 3-wire connection uses a reference lead to correct for the lead wire error while the 4-wire connection, also known as four contact connection, simply removes the lead wire error by not allowing the error to be introduced in the first place as will be explained below. FIG. 5 is a circuit diagram of a temperature sensing circuit 500 interconnecting the sensing element 502 of a temperature probe module 108 via a measurement network showing using a 4-wire connection, according to one embodiment. The 4-wire connection, also known as a Kelvin connection, separates current flow through the Pt RTD 502 from current used to sense the voltage drop across the Pt RTD. Excitation current from an electrical generator 506 flows through the Pt RTD 502 via wires 508 and returns to electrical mass 510 via wire 512 while the sense leads 514 and 516 of an ADC 504 (part of the acquisition module 112) sample the voltage drop directly across the Pt RTD 502. The voltage drop across the excitation leads is eliminated from the measurement by the direct contact connection of the sensing leads to the Pt RTD 502. The circuit 500 also shows the electrical switches 520 of the temperature probe module that are used to connect the sensing element 502 to the ADC 504 as has been mentioned above. In FIG. 5, an electrical switch per wire (i.e. 4 electrical switches) of the measurement network is shown but the number of electrical switches may be different: for instance the number of switches may be different if the number wires of the measurement network is different. In other embodiment, a switch may not be provided on each of the wire. Only two switches on the wires 514, 516 connecting the sensing element 502 to the ADC 504 may be sufficient.

One of the challenges in making low-level measurements is separating the signal from voltage offsets. Voltage offsets may be caused by ADC or amplifier input offset voltages, ADC or amplifier input leakage currents, switch leakage currents, stray leakage currents, and thermocouple (Seebeck) effects from dissimilar metals. Such errors can be compensated by using alternating or reverse drive voltage. This technique is known as a current-reversal method. Sampling the absolute voltage across each resistor under normal and reverse drive conditions gives a direct measurement of the voltage drop that cancels out offsets. The subtraction can be performed digitally by the data acquisition module. Applying alternating current (AC) or reverse drive to the excitation current removes or reduces voltage offset errors by at least an order of magnitude. Alternating current can be used to provide normal and reverse drive. Alternating the current polarity can be performed by a multiplexer that may be part of the ADC or may be an external device. The microcontroller can control the multiplexer to select the current polarity of the drive voltage. Alternately, or additionally, one or more switches can be included to change polarity of the drive voltage.

To improve accuracy further, offset errors that cannot be addressed by the current-reversal method can be ascertained from something that is known. Once the remaining error is determined, the equivalent leakage resistance can be removed from the measured Pt RTD resistance to obtain the intended Pt RTD resistive value. To remove these errors, a precision resistor can be used in place of an RTD in one of the temperature probes 108 to characterize these errors and perform quality check of the system. The precision resistor should be known and should have a relatively stable resistance values over certain temperature ranges. Typically, the data acquisition module has at least one temperature probe 108 with the RTD replaced by a precision resistor, but precision resistors may also replace RTD in the distributed array of temperature probes. For example, one may be placed at the start, middle, and the end of the temperature array. The ratio from the ratiometric measurement of the resistance of the precision resistor over the resistance of the reference resistor can be compared to its theoretical value and any shift in the measurement will be indicating the presence of errors not compensated by the current-reversal method.

The device temperature is substantially the same as the temperature of the environment with some self-heating errors. Self-heating errors can be reduced by using the lowest current possible or using a narrow current pulse. In the second case, the measurement is faster than the thermal rise in the resistive element.

In some cases, the voltage-drop developed across the reference resistor can be connected to the voltage reference port of the ADC. When the voltage-drop developed across the RTD is connected to the voltage input port of the ADC, the ADC compares the input voltage to a reference voltage (obtained via the reference resistor) and generates a binary ratio, as described above. The binary ratio is proportional to the input voltage with respect to the reference voltage of the ADC. Such arrangements make data acquisition faster since only one measurement is required instead of two to get a ratio.

Typically, a current source is used to drive the resistor networks described herein, but when changes of the resistor network due to temperature are less than 15%, voltage drive can be used considering that most current sources can change by 15% when operated over a large temperature range.

Figure 6:
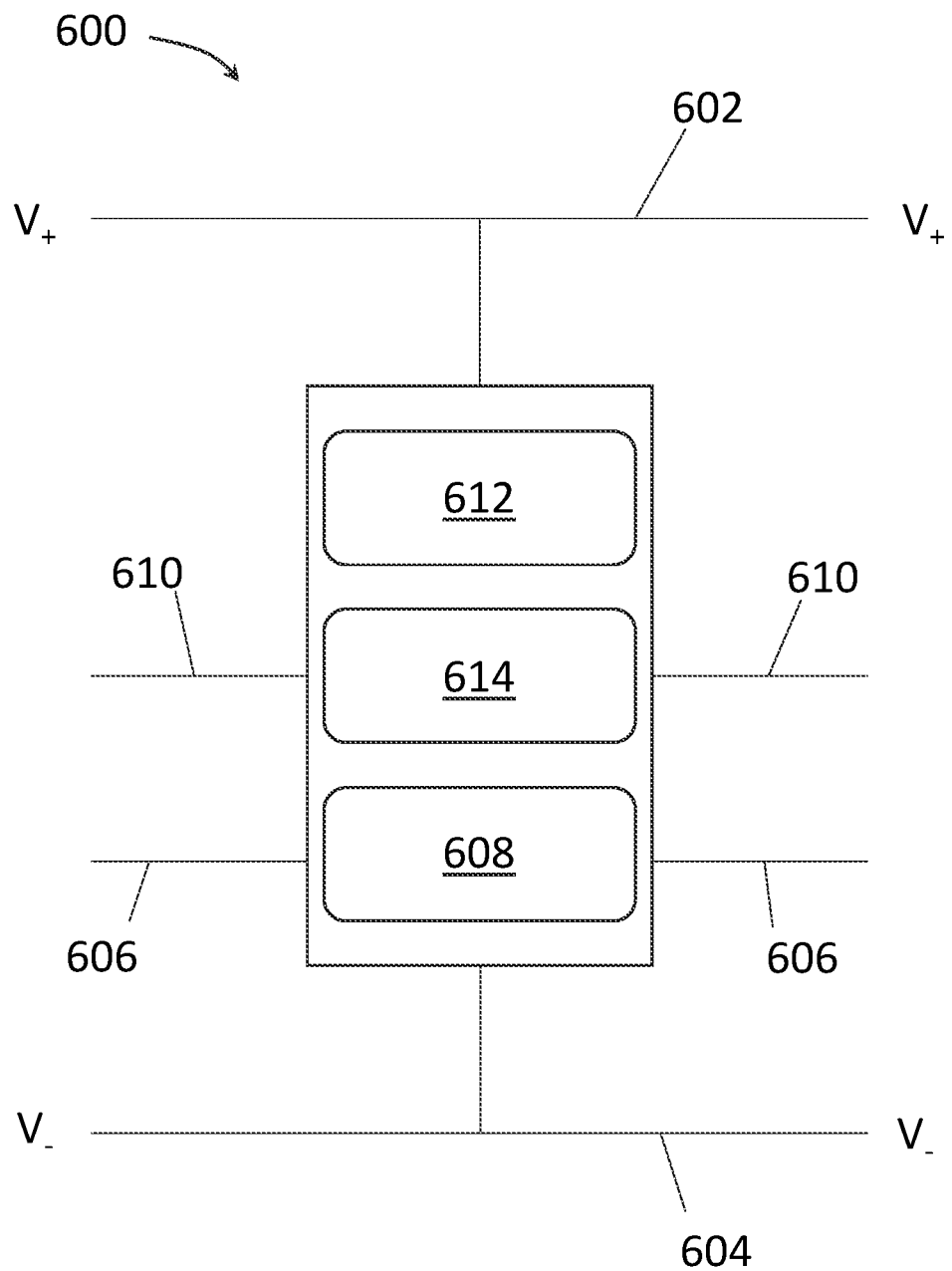
FIG. 6 is a schematic block diagram of a temperature probe according to one embodiment.

FIG. 6 is a schematic block diagram of a temperature probe 600 according to one embodiment. The temperature probe 600 can be used as any or all of the temperature probes 108 described herein. The electrical network powering the temperature probe 600 comprises a positive voltage supply rail 602 and a negative voltage supply rail 604. Digital lines 606 forming the logic network connect a digital logic circuit 608 to the logic circuit of the data acquisition module (112, FIG. 1), or to the logic circuit of another temperature probe to build a chain of serially addressable temperature probes. Analog lines 610 connect an absolute voltage developed across a resistive temperature device 612, which may be any of the resistive temperature devices described herein, to the input connection of the ADC of the data acquisition module for instance as disclosed in relationship in FIG. 5. The connection is made using one or more switches 614 as described in more detail above in connection with FIG. 5.

Figure 7:
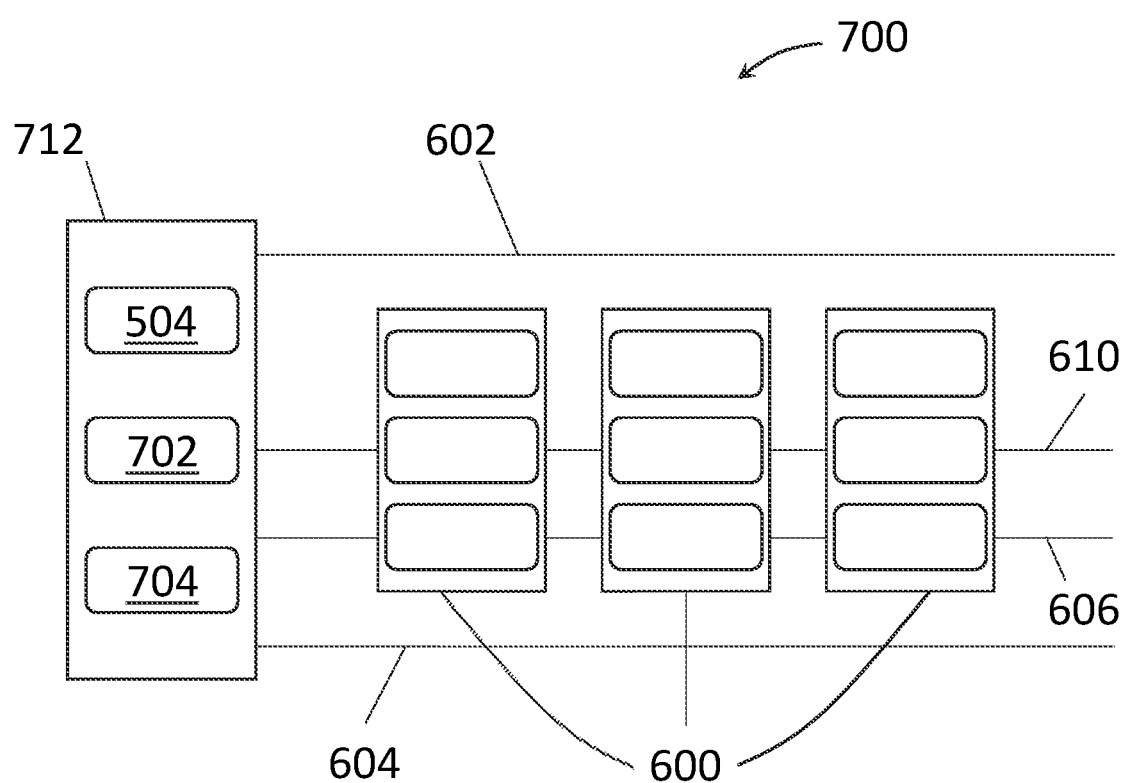
FIG. 7 is a schematic block diagram of a thermal flux apparatus, according to one embodiment.

FIG. 7 is a schematic block diagram of a thermal flux apparatus 700, according to one embodiment. Combining various components discussed above, FIG. 7 illustrates how a collection of the temperature probes 600 are connected to a data acquisition module 712. All the sensing elements 612 are connectable with analog lines 610, by control of switches 614 and all of the digital logic circuits 608 are connected in series by digital lines 606 to build a long chain of serially addressable temperature probes 600. The data acquisition module 712, in this case, includes a reference resistor 702 to allow for quality control of the temperature probes 600, and an AC drive 704 to drive current reversal, as described above. The reference resistor 702 can also be used to test the data acquisition module 712 without having temperature probes 600 connected.

The logic circuits 608 can be configured as a shift register to digitally select and activate individual temperature probes 600, in particular sensing element. Each logic circuit 608 can be configured to operate one or more electrical switch such as the switches 614 that connect the sensing elements 612 to the data acquisition module 712, for example to the input connection of the ADC. Each switch can be operated by a bit state of the corresponding logic circuit 608. Where two switches are to be operated, the logic circuit can be configured to have a two-bit state. Configuring the connected logic circuits 608 as a shift register allows a control message to be digitally transmitted to the shift register, resulting in setting the bit states of the various logic circuits 608. In this way, the digital circuit of the data acquisition module can trigger operation of the electrical switches associated with particular sensing elements by transmitting the control message.

Figure 8:
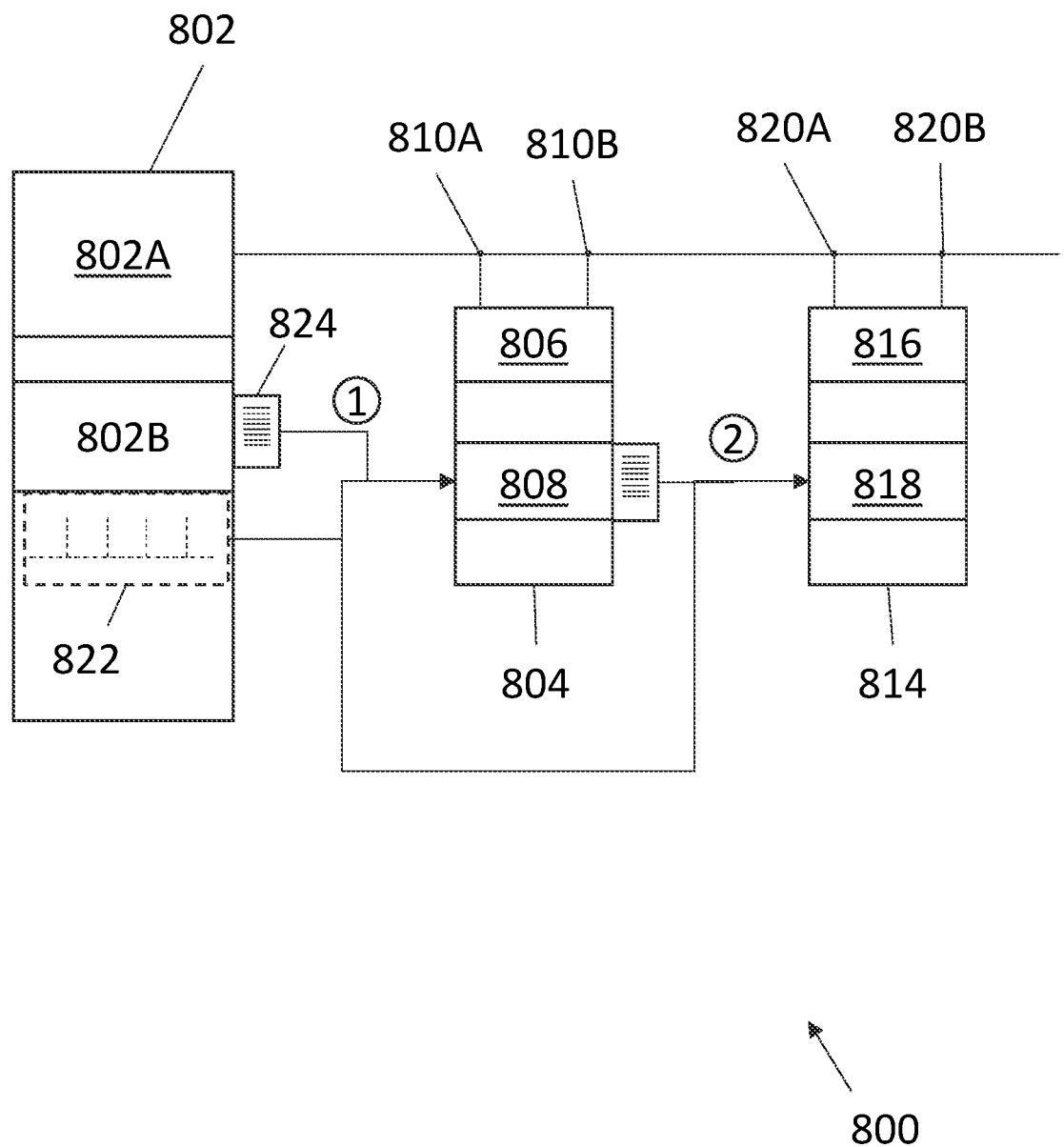
FIG. 8 is an algorithm diagram summarizing a process, according to one embodiment, for operating temperature probe modules connected as described herein.

In one embodiment, the digital circuit of the data acquisition module 712 is configured to transmit a common clock signal to the logic circuits 608 as voltage "beats," and the logic circuits 608 are configured to perform operations that are synchronized by the clock signal. FIG. 8 is an algorithm diagram 800 summarizing a process for operating temperature probe modules connected according to the description herein. A first temperature probe module 804, including a first sensing element 806, a first logic circuit 808, and first electrical switches 810A and 810B, is connected to a data acquisition module 802, which includes an ADC 802A and digital circuit 802B as described herein. Also connected to the data acquisition module 802 is a second temperature probe module 814, which includes a second sensing element 816, a second logic circuit 818, and second electrical switches 820A and 820B. The components are connected according to the electrical networks described herein. The digital circuit of the data acquisition module 802 publishes a clock signal 822, as described above, to the logic circuits 808 and 818.

For example, the digital circuit 802B can send a control message 824 to the first logic circuit 808 at a first beat, designated by the circled number "1," of the clock signal 822. The control message 824 can contain instructions for execution by the first logic circuit 808 to operate the electrical switches 810A and 810B of the first temperature probe module 804 in a desired way, for example to connect the sensing element 806 of the first temperature probe module 804 to the input connection of the ADC 802A. The first logic circuit 808 can also be configured to take actions at the first beat "1" that are not contained in the control message 824 received from the digital circuit 802B, for example to set or clear ready bits of the first logic circuit 808.

The first logic circuit 808 can be configured, either by instructions received in the control message 824, or by separate configuration instructions, to perform certain operations at a second beat, designated by the circled number "2," of the clock signal 822, which may be the next beat after the first beat "1" or a subsequent beat. For example, the first logic circuit 808 can be configured to transmit the control message 824 received from the digital circuit 802B at the first beat "1" to the second logic circuit 818 at the second beat "2". The first logic circuit 808 can be configured, either by instructions received in the control message 824, or by separate configuration instructions, to operate the electrical switches 810A and 810B of the first temperature probe module 804 in a desired way, for example to disconnect the sensing element 806 of the first temperature probe module 804 from the input connection of the ADC 802A and/or to erase the control message 824 received from the digital circuit 802B at the second beat "2" after transmitting the control message 824 to the second logic circuit 818. In this way, the digital circuit 802B of the data acquisition module 802 can trigger resistive ratio measurements of each temperature probe 804 and 814 in a sequence. The resistive measurements can be related to temperature by the digital circuit 802B, so temperature at each temperature probe module is resolved.

As noted above, the logic circuits of the temperature probe modules can be configured as a shift register. In other embodiments, the logic circuits can be configured to be independently addressable by the digital circuit, so the digital circuit can be configured to activate the temperature probe modules in any desired sequence. For example, if the temperature probe modules are located at different depths in a vertical well, the digital circuit can be configured to activate the temperature probe modules in sequence from bottom to top, top to bottom, or by any other sequence. The sequence can be contained in the control message sent to the first logic circuit 808 as a mapping of temperature probe modules that governs how the logic circuits relay the control message. The mapping may specify that logic circuit A will transmit the control message to logic circuit B, and logic circuit B will transmit the control message to logic circuit C. Each logic circuit can be configured, by instructions received in the control message 824 or by separate configuration, to look up its prescribed transmission destination and act accordingly. The mapping may be one-to-one or one-to-many. That is to say, in some cases logic circuit A may be configured to transmit the control message to logic circuits B and C at the second beat of the clock cycle.

While the foregoing is directed to embodiments of the subject matter of this disclosure, other and further embodiments of the present disclosure may be devised without departing from the basic scope thereof, and the scope thereof is determined by the claims that follow.

What is claimed is:

1. A thermal flux apparatus, forming a distributed temperature measurement system and comprising:
    a plurality of temperature probe modules, each temperature probe module comprising:
    a sensing element having an electrical resistance that varies with temperature;
    at least two electrical switches; and
    a logic circuit configured to control the electrical switches of the temperature probe module,
    a data acquisition module comprising an analog-to-digital converter with an input electrically connectable to the plurality of temperature probe modules; and
    an electrical network comprising between 6 and 8 wires connecting each temperature probe module with the data acquisition module;
    wherein the at least two electrical switches of each temperature probe module are operable to connect the sensing element of said temperature probe module to the input of the analog-to-digital converter of the data acquisition module;
    wherein the data acquisition module comprises a digital circuit electrically connected to, and configured to control, the logic circuit of each temperature probe module.

2. The thermal flux apparatus according to claim 1, wherein the data acquisition module comprises:
    a reference resistor having a reference resistance that is temperature stable;
    wherein the analog-to-digital converter is electrically connected to the reference resistor and is configured to output a ratio of the resistance of the sensing element of at least one of the temperature probe modules to the reference resistance.

3. The thermal flux apparatus according to claim 2, wherein the data acquisition module further comprises a drive voltage source electrically connected to the reference resistor and to the sensing element of at least one of the temperature probe modules.

4. The thermal flux apparatus according to claim 3, wherein the data acquisition module further comprises a controller configured to change the polarity of the drive voltage to form an alternating drive voltage.

5. The thermal flux apparatus of claim 1, wherein the number of wires of the electrical network is independent of the number of temperature probe modules.

6. The thermal flux apparatus of claim 1, wherein the plurality of temperature probe modules comprises more than sixteen temperature probe modules.

7. The thermal flux apparatus of claim 1, wherein the electrical network is configured to electrically connect the sensing elements of the temperature probe modules in parallel.

8. The thermal flux apparatus of claim 1, wherein the electrical network is configured to electrically connect the logic circuits in series.

9. The thermal flux apparatus of claim 1, wherein the logic circuits are configured to operate as a shift register.

10. The thermal flux apparatus of claim 9, wherein each logic circuit is configured to control the electrical switches of the respective temperature probe module to connect and disconnect sequentially the sensing elements of the temperature probe modules to the analog-to-digital converter.

11. The thermal flux apparatus of claim 9, wherein the digital circuit of the data acquisition module is configured to control the shift register, wherein the data acquisition module is configured to drive the logic circuits using a common clock signal comprising a plurality of beats and to transmit a control message to a first logic circuit of a first temperature probe module of the plurality, wherein the control message includes instructions for connecting the sensing element of the temperature probe module to the analog-to-digital converter using the electrical switches of the temperature probe module.

12. The thermal flux apparatus of claim 11, wherein the logic circuits are configured so that, at a predetermined beat of the clock signal, the control message is transmitted from the first logic circuit to a second logic circuit of a second temperature probe module of the plurality and is erased from the first logic circuit.

13. A downhole tool, comprising:
    a tubular housing; and
    a thermal flux apparatus according to claim 1 deployed along the tubular housing.

14. The thermal flux apparatus of claim 1, wherein the electrical network comprises:
    a positive voltage supply rail,
    a negative voltage supply rail,
    digital lines forming a logic network connecting the logic circuit of each temperature probe module to the digital circuit of the data acquisition module or to the logic circuit of another temperature probe module to build a chain of serially addressable temperature modules; and analog lines connecting the sensing element of each temperature probe module of the analog-to-digital converter of the data acquisition module, using the at least two electrical switches of each temperature probe module.

15. A thermal flux apparatus, forming a distributed temperature measurement system and comprising:
a plurality of temperature probe modules, each temperature probe module comprising a sensing element having an electrical resistance that varies with temperature, at least two electrical switches, and a logic circuit configured to control the electrical switches;
a data acquisition module comprising an analog-to-digital converter with an input connected to the plurality of temperature probe modules, and a digital circuit electrically connected to the logic circuits; and
an electrical network connecting each temperature probe module with the data acquisition module,
wherein the at least two electrical switches of each temperature probe module are coupled to the sensing element of the respective temperature probe module to connect the sensing element to the input of the analog-to-digital converter,
wherein the logic circuits of the temperature probe modules are configured to operate as a shift register and the digital circuit of the data acquisition module is configured to control the shift register, wherein the data acquisition module is configured to drive the logic circuits using a common clock signal comprising beats and to transmit a control message to a first logic circuit of a temperature probe module of the plurality, wherein the control message includes instructions for connecting the temperature probe module to the analog-to-digital converter using the electrical switches.

16. A downhole tool, comprising:
a tubular housing; and
a thermal flux apparatus according to claim 15 deployed along the tubular housing.

17. A method for operating a thermal flux apparatus, wherein
the apparatus forms a distributed temperature measurement system and comprises:
a plurality of temperature probe modules, each temperature probe module comprising a sensing element having an electrical resistance that varies with temperature, at least two electrical switches, and a logic circuit configured to control the electrical switches;
a data acquisition module comprising an analog-to-digital converter having an input connected to the plurality of temperature probe modules, and a digital circuit electrically connected to and configured to control the logic circuit of at least one temperature probe module; and
an electrical network connecting each temperature probe with the data acquisition module,
wherein the at least two electrical switches of each temperature probe module are operable to connect the sensing element to the input of the analog-to-digital converter,
wherein the method comprises:
transmitting via the digital circuit a clock signal comprising a plurality of beats to the logic circuits;
at a first beat of the clock signal, transmitting via the digital circuit a control message to a first logic circuit of a first temperature probe module of the plurality;
upon reception of the control message by the first logic circuit, controlling the electrical switches of the first temperature probe module via the first logic circuit to connect the sensing element of the first temperature probe module to the analog-to-digital converter;
at a second beat of the clock signal, transmitting the control message from the first logic circuit to a second logic circuit of a second temperature probe module of the plurality;
upon transmission of the control message by the first logic circuit, controlling the electrical switches of the first temperature probe module via the first logic circuit to disconnect the sensing element of the first temperature probe module from the analog-to-digital converter;
upon reception of the control message by the second logic circuit, controlling the electrical switches of the second temperature probe module via the second logic circuit to connect the sensing element of the second temperature probe module to the analog-to-digital converter.

18. The method of claim 17, including computing resistance of the respective sensing elements of the first and second, temperature probe modules, via the analog-to-digital converter, when each respective sensing element is connected to the analog-to-digital converter.

19. The method of claim 17, further comprising deploying the thermal flux apparatus in a downhole tool.

* * * * *